(12) United States Patent
Ngo et al.

(10) Patent No.: US 10,554,668 B2
(45) Date of Patent: Feb. 4, 2020

(54) METHOD AND APPARATUS FOR PROVIDING VENDOR REMOTE SUPPORT AND MANAGEMENT

(71) Applicant: BOMGAR CORPORATION, Ridgeland, MS (US)

(72) Inventors: Huey Jiun Ngo, Flowood, MS (US); Nathan Joel McNeill, Ridgeland, MS (US); David William Durham, Raymond, MS (US); Nathan Whiteford Cromer, Brandon, MS (US)

(73) Assignee: BOMGAR CORPORATION, Ridgeland, MS (US)

( * ) Notice: Subject to any disclaimer, the term of this patent is extended or adjusted under 35 U.S.C. 154(b) by 0 days.

(21) Appl. No.: 15/489,294

(22) Filed: Apr. 17, 2017

(65) Prior Publication Data

US 2017/0223059 A1    Aug. 3, 2017

Related U.S. Application Data

(63) Continuation of application No. 12/755,347, filed on Apr. 6, 2010, now abandoned.

(60) Provisional application No. 61/166,962, filed on Apr. 6, 2009.

(51) Int. Cl.
*H04L 29/06* (2006.01)
*G06F 21/62* (2013.01)
*G06Q 30/06* (2012.01)

(52) U.S. Cl.
CPC ........ *H04L 63/105* (2013.01); *G06F 21/6218* (2013.01); *G06Q 30/06* (2013.01); *H04L 63/029* (2013.01); *H04L 63/0218* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,117,529 B1 * | 10/2006 | O'Donnell | G06Q 30/018 726/6 |
| 7,565,700 B2 | 7/2009 | Bellwood et al. | |
| 7,941,848 B2 | 5/2011 | Yadav et al. | |
| 8,166,310 B2 * | 4/2012 | Harrison | G06F 21/305 713/184 |
| 2002/0075844 A1 | 6/2002 | Hagen | |
| 2003/0004791 A1 | 1/2003 | Kojima | |
| 2003/0065731 A1 * | 4/2003 | Mohammed | G06F 21/33 709/208 |
| 2003/0084010 A1 * | 5/2003 | Bigus | G06F 11/2257 706/6 |
| 2003/0149740 A1 * | 8/2003 | Wookey | H04L 29/06 709/217 |
| 2005/0190769 A1 | 9/2005 | Smith | |
| 2005/0234824 A1 * | 10/2005 | Gill | H04L 63/105 705/50 |
| 2008/0034060 A1 * | 2/2008 | Fisher, Jr. | G06F 9/453 709/218 |

(Continued)

*Primary Examiner* — Benjamin E Lanier

(74) *Attorney, Agent, or Firm* — Morris, Manning & Martin, LLP; Daniel E. Sineway; Adam J. Thompson

(57) ABSTRACT

An approach is provided for establishing a vendor portal configured to provide remote control and management of one or more devices of a customer by a plurality of vendors. The device can then be remotely controlled, accessed, or operated upon via the vendor portal.

20 Claims, 15 Drawing Sheets

(56) References Cited

U.S. PATENT DOCUMENTS

| | | | |
|---|---|---|---|
| 2008/0091454 A1* | 4/2008 | Fisher, Jr. | G06Q 10/103 |
| | | | 705/301 |
| 2009/0052675 A1 | 2/2009 | Levow et al. | |
| 2009/0271472 A1* | 10/2009 | Scheifler | G06F 9/485 |
| | | | 709/202 |
| 2010/0154009 A1 | 6/2010 | Del Sordo | |

* cited by examiner

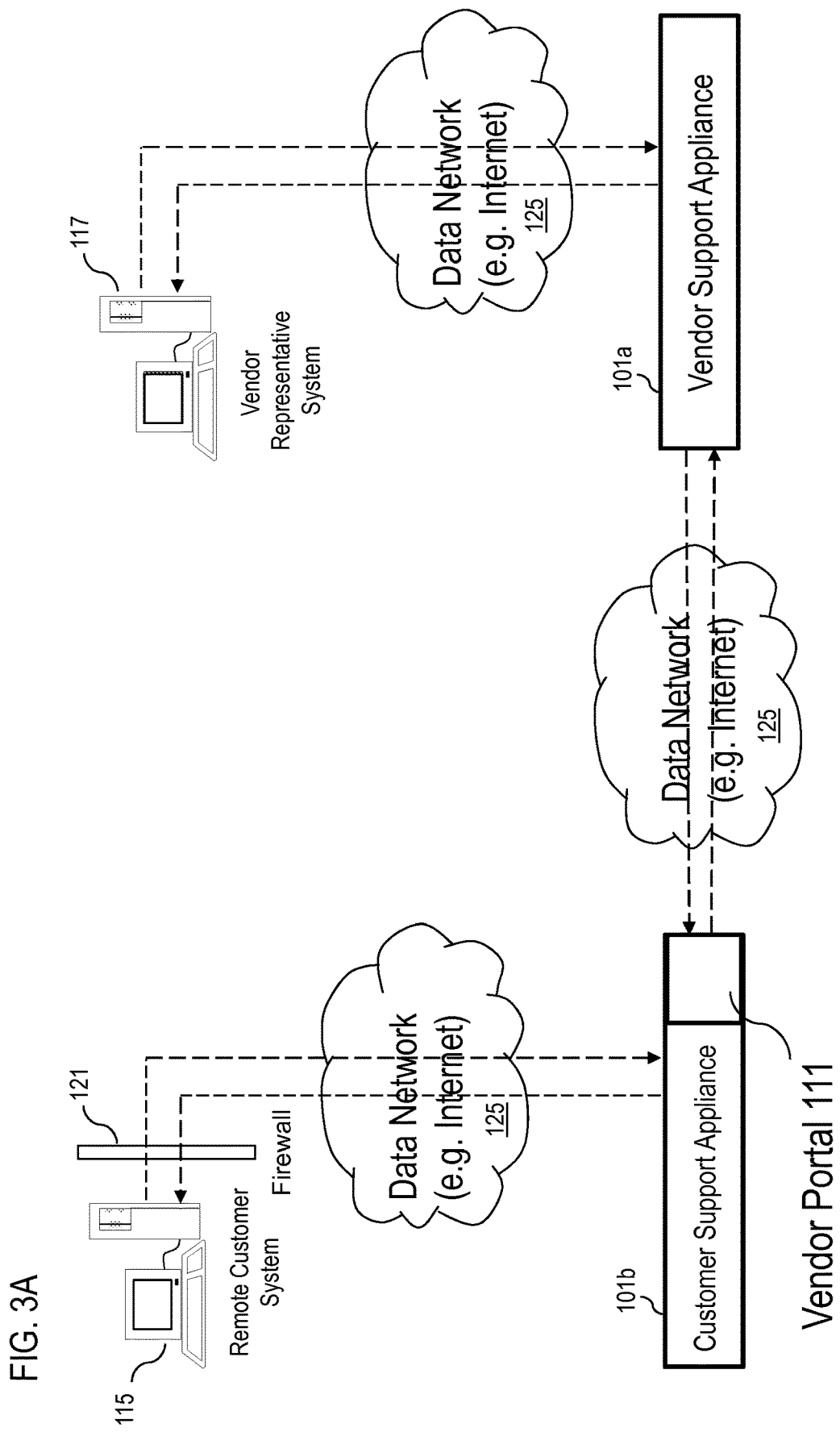

METHOD AND APPARATUS FOR PROVIDING VENDOR REMOTE SUPPORT AND MANAGEMENT

RELATED APPLICATIONS

This application is a continuation of U.S. application Ser. No. 12/755,347 filed Apr. 6, 2010, entitled "Method and Apparatus for Providing Vendor Remote Support and Management," which claims the benefit of the earlier filing date under 35 U.S.C. § 119(e) of U.S. Provisional Application Ser. No. 61/166,962 filed Apr. 6, 2009, entitled "Method and Apparatus for Providing Vendor Remote Support and Management," the entireties of which are incorporated by reference.

BACKGROUND OF THE INVENTION

Information Technology (IT) companies and departments who support their customers' computer systems are constantly challenged with the need to provide timely and cost-effective support to their customers. Remote support provides the means for IT professionals to remotely access and to control customers' computer systems. This eliminates the need for the IT professionals to travel on-site to fix a problem and the delays in response time.

Enterprises (or organizations) have many challenges when receiving support from a technology vendor via remote control or remote access technologies. When a system or application requires support and maintenance from a vendor, the vendor must be granted access in order to service the system or application effectively. Often, each technology vendor uses a different product, leaving the organization receiving support with little or no control over what remote access or remote control technologies are used. Most remote access and remote control tools support only "all or nothing" access, resulting in the vendor having much greater access than is required. Because of this, the organization receiving support does not have the ability to granularly control the permissions, access, and privileges granted to the technology vendor. Moreover, existing approaches do not record the activity of the technology vendor in the process of supporting the organization that is receiving support. In other words, support incidents do not have audit trails. This lack of control and lack of audit-ability undermines the compliance posture of the organization receiving support, thereby increasing the liability associated with receiving technology support from a vendor.

Based on the foregoing, there is a clear need for approaches that provide remote support and management involving multiple vendors.

BRIEF DESCRIPTION OF THE DRAWINGS

FIGS. 3A and 3B are, respectively, diagrams of a system and associated process for providing vendor presence on a customer appliance via a vendor's appliance, according to certain embodiments;

DESCRIPTION OF THE PREFERRED EMBODIMENT

An apparatus, method, and software for providing a vendor remote support and management system are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments of the invention are described with respect to a wired network, it is contemplated that these embodiments have applicability to other networks including wireless systems.

Figure 1A:
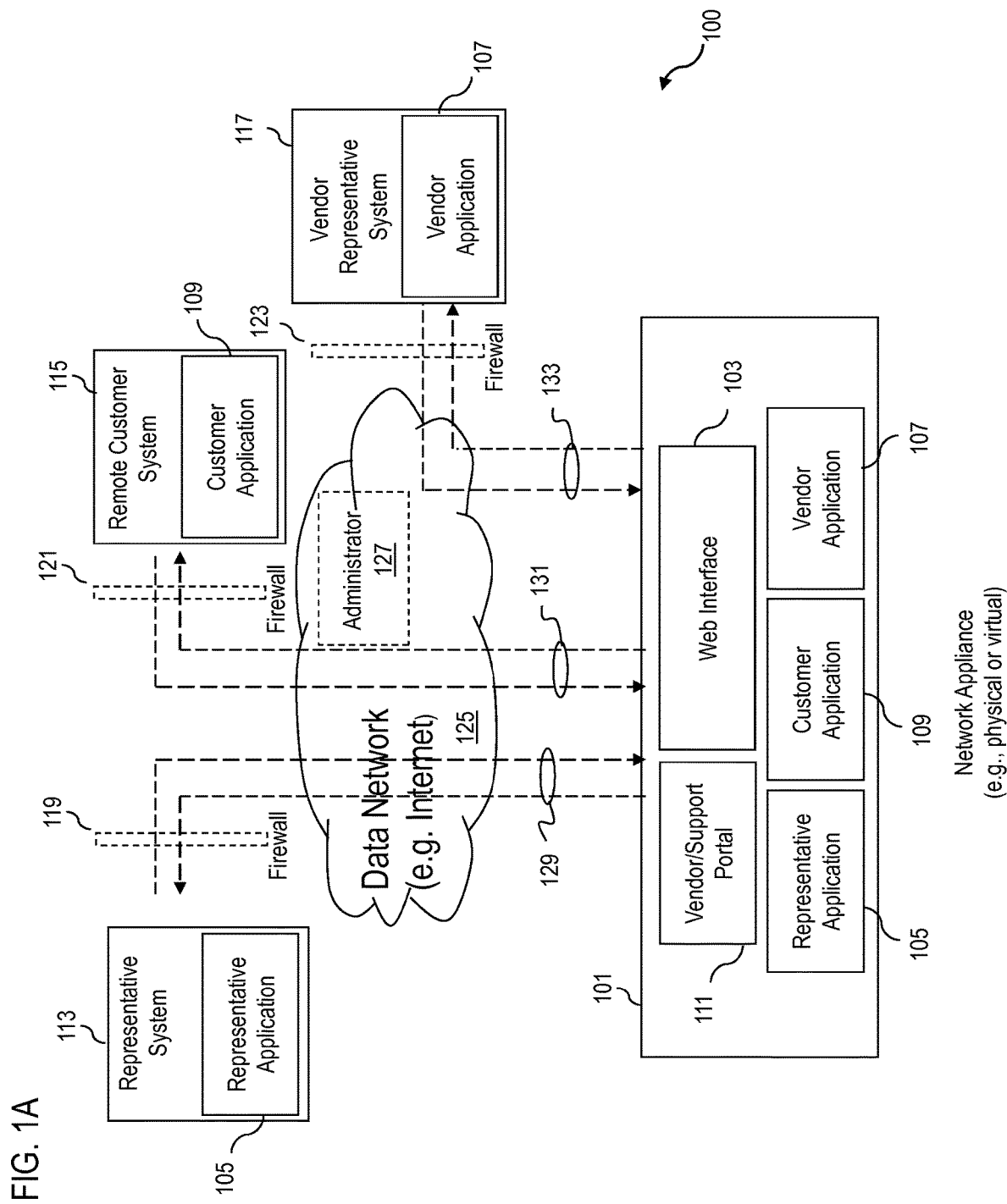
FIGS. 1A and 1B are, respectively, diagrams of a system and associated process for providing vendor remote support and management, according to certain embodiments.
Figure 1B:
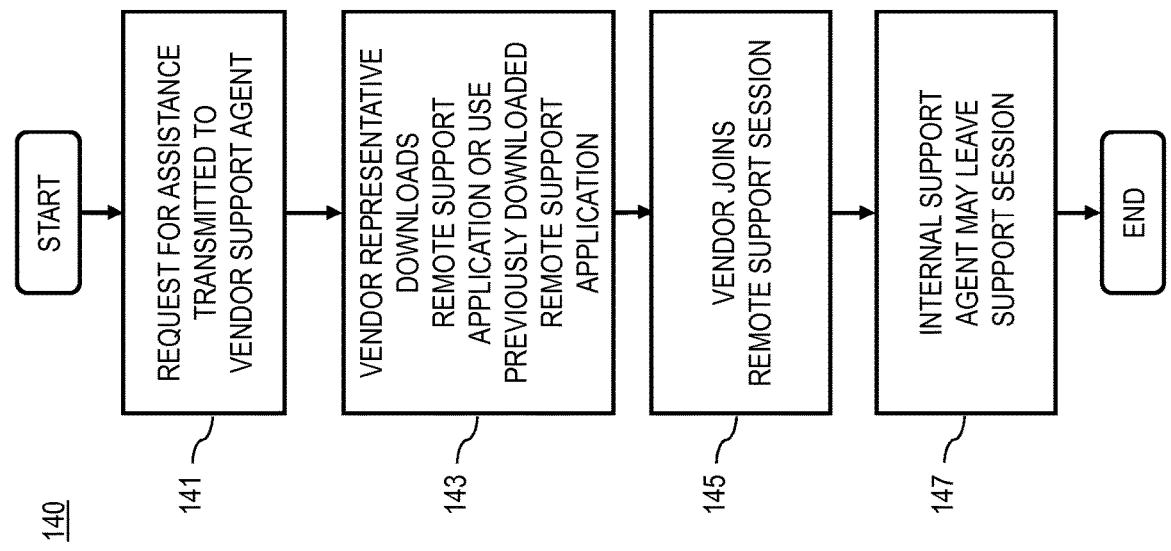

FIGS. 1A and 1B are, respectively, diagrams of a system and associated process for providing vendor remote support and management, according to certain embodiments. As shown in the system 100 of FIG. 1A, a remote access and control appliance 101 provides, in certain embodiments, a remote support mechanism that is secure and implemented in a turn-key fashion. For the purposes of illustration, the appliance 101 can be deployed by a customer or a vendor and accessed by a vendor or various vendors, and is referred to as a "support appliance" 101. The deployed appliance 101 can serve as a remote support and management system for the organization that is receiving support from the vendor. In one embodiment, the appliance 101 is implemented according to an onsite deployment model. A hosted Software-as-a-Service (Saas) model can also be an offering of this approach where the customers' as well as the vendors' self administered solutions can be in a hosted infrastructure. In addition, the appliance 101 can be further defined as a physical or virtual computing system. This can include but not limited to a server rack-mountable server, non-rack-mountable server, desktop computer, laptop computer, and virtual machines.

In one exemplary embodiment, the appliance 101 is a rack-mountable (e.g., 1U) network appliance that can be installed and deployed at customers' site; in this manner, data security is in the customers' full control. Additionally, the remote access and control appliance 101 has the capability of allowing on demand product use from anywhere in the world. For example, as long as the network appliance 101 is deployed accessible via a public Internet Protocol (IP) address, a support user can log in his/her account via a web interface 103 hosted on the network appliance 101.

A Representative Client or Application (local client) 105 and a Vendor Representative Client or Application 107 can be downloaded from a web interface 103 to provide remote access or support. Also, a Customer Client or Application (remote client) 109 can be downloaded by submitting an incident by visiting a vendor/support portal 111 of the web interface 103—which can also be hosted on the network appliance 101.

The network appliance 101, in various embodiments, execute software applications that can receive, handle, manage, and dispatch system or data messages to and from the Representative Client 105, the Customer Client 109, and/or Vendor Client 107 via a secure connection (e.g., 256-bit Advance Encryption Standard (AES) Secure Sockets Layer (SSL)).

As seen in FIG. 1A, a representative (Rep) at a Representative System 113 (i.e., local system) provides support to a customer at a Remote System 115 (i.e., Remote Customer System). Additionally, a vendor representative system 117 communicates with the appliance 101. The traffic between the local system 113, the remote system 115, and the vendor system 117 is handled and managed at the network appliance 101. Due to the fact that the system 100 is designed such that all session initiations are outbound towards the network appliance 101, the product works through firewalls 119-123 and proxy servers.

In this example, the representative system 113 provides, in certain embodiments, a remote vendor support mechanism that is secure and implemented in a turnkey fashion to one or more remote customers systems 115 via one or more vendor systems 117 over a data network 125 using the network appliance 101. By way of example, the data network 125 can be an internetwork, such as the global Internet, or a private network. The traffic between the representative system 113, the vendor representative system 117, and any customer system 115 is handled and managed at the network appliance 101. In an exemplary embodiment, the network appliance 101 is managed by an administrator 127, who can access the network appliance 101 using a graphical user interface (GUI), such as a web interface 111.

The remote access and control appliance 101 also enables the administrator 127 to change settings (configuration parameters) on the appliance 101 itself, in addition to the software it contains. The appliance 101 also provides management functions including the management of one or more representative systems 113 and/or vendor systems 117 via the web interface 111. After physical installation of the appliance 101, the administrator 127 may log on to the appliance via the web interface 111 by using the appliance's public Uniform Resource Locator (URL) address.

In an exemplary embodiment, the representative system 113 can communicate with the customer system 115 and/or the vendor system 117 using the network appliance 101 via the web interface 111 through one or more firewalls 119-123 over respective secure links 129-133. These firewalls 119-123 may be implemented at the representative's site, the remote customer's site, the vendor's remote site, or a combination thereof. Alternatively, no firewall exists at any of the sites. FIG. 1A illustrates the firewall 119 at the representative's site, the firewall 121 at the remote customer's site, and the firewall 123 at the vendor representative's site. According to one embodiment, the representative system 113, the customer system 115, and the vendor representative system 117 connect outbound to the appliance 101, thereby eliminating firewall incompatibilities. As such, the appliance 101 can operate through the firewalls 119-123 as well as through proxy servers (not shown).

In certain embodiments, vendor portals 111 are created for providing remote access and remote control by the remote vendor system 117 to internal customer systems 115 and customer applications 109. For example, vendor agents' security policies can then be administered to control access rights, remote control permissions, and other parameters and guidelines. Consequently, the vendor support agents are provided with only the level of access to the respective systems 113, 115, and/or 117 that is required to service the systems effectively. In one embodiment, all activities relating to vendor remote access and remote control through one or more vendor portals 111 are recorded and can be audited to ensure compliance with the predetermined regulations. Under this arrangement, support can be received from one or more technical vendors (e.g., via the vendor representative system 117), while maintaining complete control over the vendor's level of access as well as a complete audit trail of the vendor's activity within the system 100. This decreases the potential liability associated with receiving technology support from an external vendor.

In addition to providing a secure means to receive support from a technology vendor, the vendor remote support and management system provided via the appliance 101 can be extended to enable the technology or technology services vendor to support their customers more securely and efficiently through establishing a connection between the vendor's remote support system (e.g., facilitated via a network appliance 101 operated by the vendor) and their customers' remote support system vendor portals 111. For example, the customers can themselves utilize or operate a remote support and management system through another network appliance 101; accordingly, the customers' remote support and management systems (e.g., executing on a common network appliance 101 or respective other network appliances 101) can be accessed via their respective vendor portals 111. In this manner, the vendor can create and administer support agent accounts for their own remote support and management system. The vendor's support agents can then log into their own secure and self-administered system, and then, through an established connection (e.g., secure connections 129-133) to their customer's secure and self-administered system's vendor portal 111, the reps can gain access to the customer's systems 115 and applications 109. In this way, both the organization receiving support and the technology vendor can administer their own approaches or respective appliances 101. However, even though the Support Solutions are connected, the organization (e.g., the customer) receiving support has complete control over the permissions of the vendor's support agents when those agents are accessing the organization's systems 117 and applications 107. Similarly, with connected vendor remote support and management systems, the vendor organization can administer its own support agents and easily remotely access its customers' systems 115 and applications 109, while at the same time giving its customers complete control over vendor's access permissions and complete visibility into the vendor's activity. Additionally, connected appliances 101 provide both the vendor and the organization receiving support auditable reports on support agent activity and reports of support agent performance.

A standardized, secure vendor remote support and management system via the appliance 101 such as described herein will provide a means not only for giving support to users and customers but also a means of receiving support from their vendors.

In one embodiment, the vendor portal 111 can also be extended to serve as a proxy for all attended (when an end user is present) as well as unattended (when an end user is not present) support. In an unattended scenario, the vendor portal 111 can be used as a mechanism to push a remote support executable to an end system 115 and/or used as a mechanism to initiate a pre-installed client 109 to establish a remote support session back to the support agent. For preinstalled clients 109, this vendor portal 111 can also serve as an agent to collect data and statuses related to the remote systems 115. The data can be later synched with a connected vendor remote support and management system. For remote systems 115 that are not connected to the internet, this vendor portal 111 can also serve as a proxy for all remote access and remote control data, enabling a technology vendor to support systems over the internet even if the supported systems 115 are not directly connected to the internet.

The vendor portal 111 can also be used to conduct training.

Furthermore, it is noted that the self administered customer's vendor remote support and management system 101 can serve as a vendor's vendor remote support and management system 101. Hence, a customer can be a vendor, and vice versa.

By way of illustration, the following scenarios are described for deployment of the vendor remote support and management appliance 101: (1) ad-hoc vendor remote support; (2) unmediated vendor remote support and management; and (3) vendor portal 111 as an agent and a proxy.

With respect to ad-hoc vendor remote support, it is recognized that an internal support agent sometimes requires third-party assistance in providing support to an internal or external end-user or system 115. In this scenario (as shown in the process 140 of FIG. 1B), a request for assistance is sent to the vendor support agent and access privileges to the end system are granted ad-hoc (step 141). The vendor or third party support agent downloads the remote support application used for providing support, logs on with provided valid credentials or without requiring credentials (step 143), and joins or views the remote support session to assist the internal support agent in troubleshooting or supporting the end system (step 145). The internal support agent may be present throughout the remote support session or leave the remote support session after the vendor support agent joins the session (step 147).

Figure 2A:
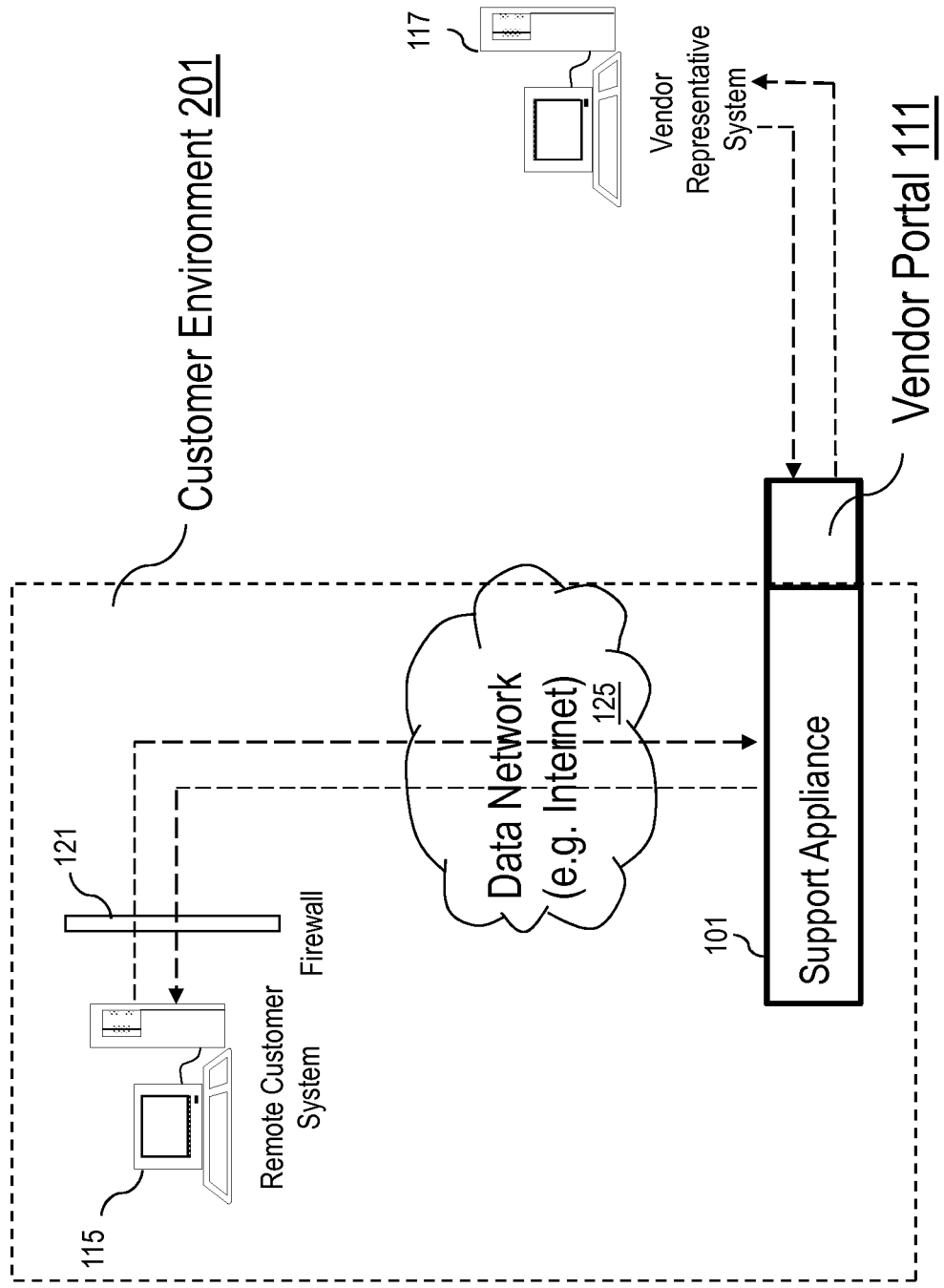
FIGS. 2A and 2B are, respectively, diagrams of a system and associated process for providing vendor presence on a customer appliance, according to certain embodiments.
Figure 2B:
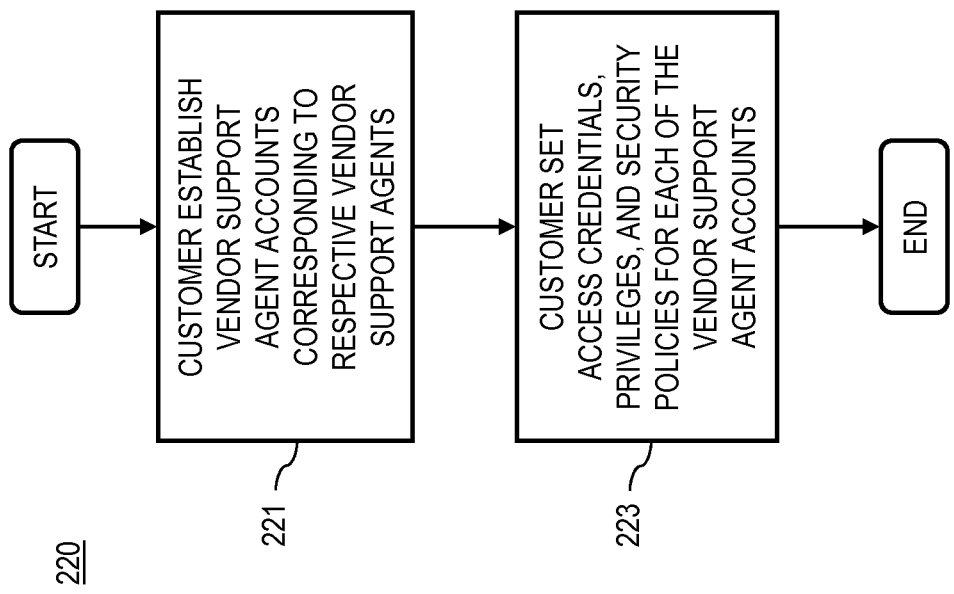

FIGS. 2A and 2B are, respectively, diagrams of a system and associated process for providing vendor presence on a customer appliance, according to certain embodiments. The process 220 of FIG. 2B is described with respect to the diagram of FIG. 2A. For this scenario, a vendor support agent requires unmediated access to an organization's systems 115 and applications 109. This level of access can be enabled by creating a vendor portal 111 that controls access privileges and permissions. With this vendor portal 111, the vendor support agent (e.g., via the vendor representative system 117) can provide attended or unattended remote support for the customer's systems 115 and applications 109 via remote access and remote control. A customer's vendor remote support and management system provided by the support appliance 101 can have multiple vendor portals 111.

By way of example, two approaches are described. One approach provides vendor presence in a customer environment 201 that includes the customer remote support system (e.g., facilitated by the customer's own network appliance 101). In this scenario (depicted in FIG. 2A and described with respect to process 220 of FIG. 2B), the vendor support agent accounts and restrictions are managed and provisioned on the customer's appliance 101 (step 221 of FIG. 2B). The customer administers a team of vendor support agent accounts that are used only by a specific vendor within the customer environment 201. The customer can create and administer multiple such teams for multiple vendors. The vendor support agents in this scenario must use access credentials, privileges, and security policies set forth by the customer (step 223 of FIG. 2B). This team created for vendor support agents serves as a component of the vendor presence on the customer system or appliance 101. The combination of team, restrictions, and access interfaces are components that make up the vendor portal 111 in this scenario.

In another approach, vendor presence is on the customer system through relationship with the vendor system.

Figure 3B:
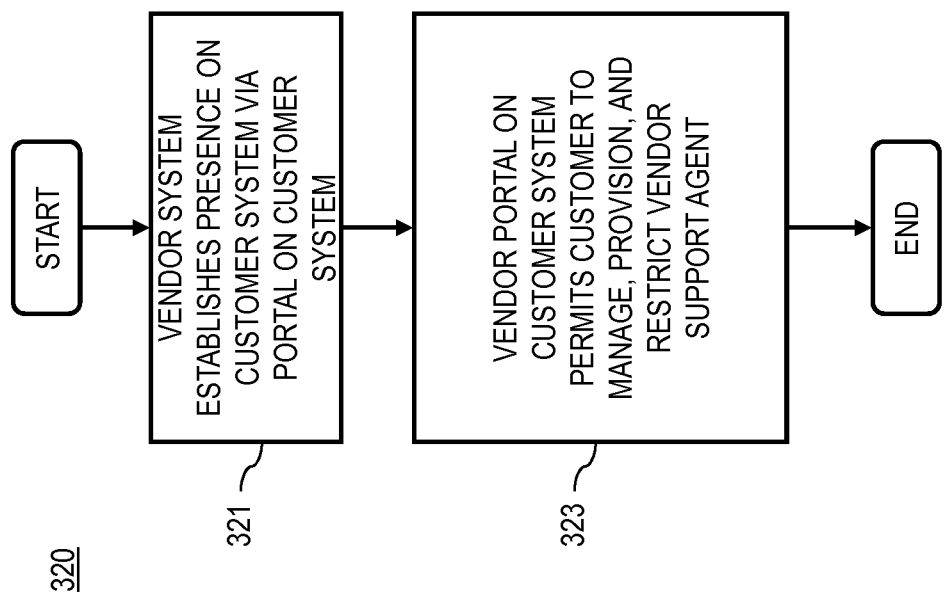

FIGS. 3A and 3B are, respectively, diagrams of a system and associated process for providing vendor presence on a customer appliance via a vendor's appliance, according to certain embodiments. The process 320 of FIG. 3B is described with respect to the diagram of FIG. 3A. As seen in FIG. 3A, the vendor support agent accounts are managed and provisioned on the vendor's self-administered system of the vendor support appliance 101a (step 321 of FIG. 3B). The vendor portal 111 on the customer appliance 101b enables the customer to further manage, provision, and restrict the vendor support agents as a whole unit or entity which is connected to the vendor portal through the vendor appliance 101a over the data network 125 (step 323 of FIG. 3B).

Figure 4:
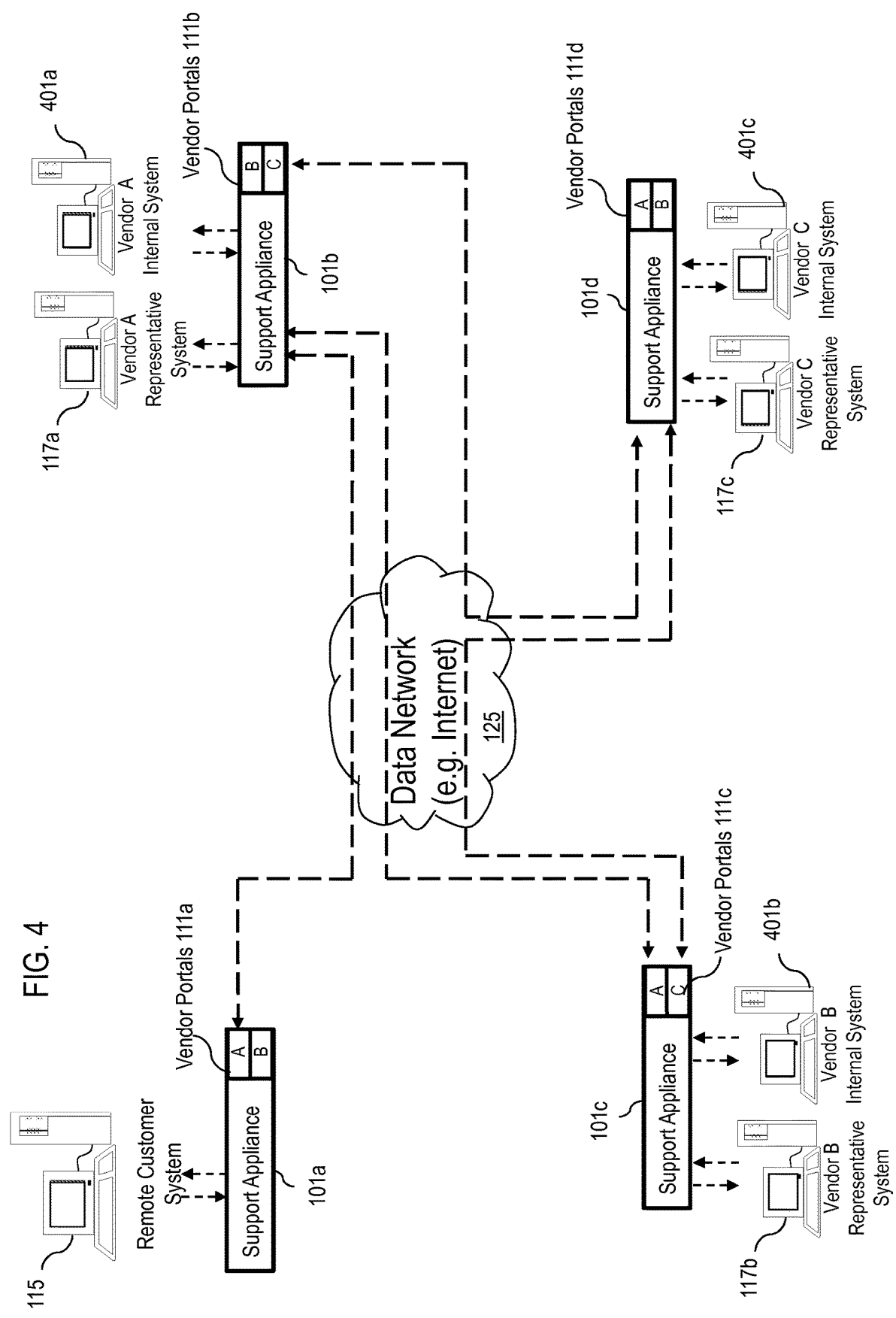
FIG. 4 is a diagram of a network of appliances with vendor presence, according to an exemplary embodiment.

FIG. 4 shows a network of remote support systems with vendor presences through connections with vendor systems, according to one embodiment. In one embodiment multiple network appliances 101a-101d may have connectivity and establish relationships over the data network 125 to form a support system. For example, a customer system can act as a vendor system; and a vendor system can act as a customer system if configured to do so (for example: a technology vendor may also be a customer to other technology vendors). As shown in FIG. 4, a remote customer system 115 and vendor representative systems 117a-117 have interrelated support systems via their respective support appliances 101a-101d. In this example, the support appliance 101a of the customer system 115 includes web portals 111a for remote support from vendor representative systems 117a (e.g., Vendor A) and 117b (e.g., Vendor B).

Vendor A, in turn, includes an internal system 401a which has connectivity to a support appliance 101b that includes web portals 101b for vendor representative systems 117a (e.g., Vendor B) and 117c (e.g., Vendor C). In other words, Vendor A provides support to the remote computer system 115 via the Vendor A representative system 117a while also receiving support for its internal system 401a from Vendors B and C. Similarly, Vendor B and Vendor C also both provide and receive support from the various depicted vendors. In this case, the internal system 401b of Vendor B has connectivity to a support appliance 101c with web portals for Vendor A's representative system 117a and Vendor C's representative system 117c, and the internal system 401c of Vendor C has connectivity to a support appliance 101d with web portals for Vendor A's representative system 117a and Vendor B's representative system 117b.

Figure 5A:
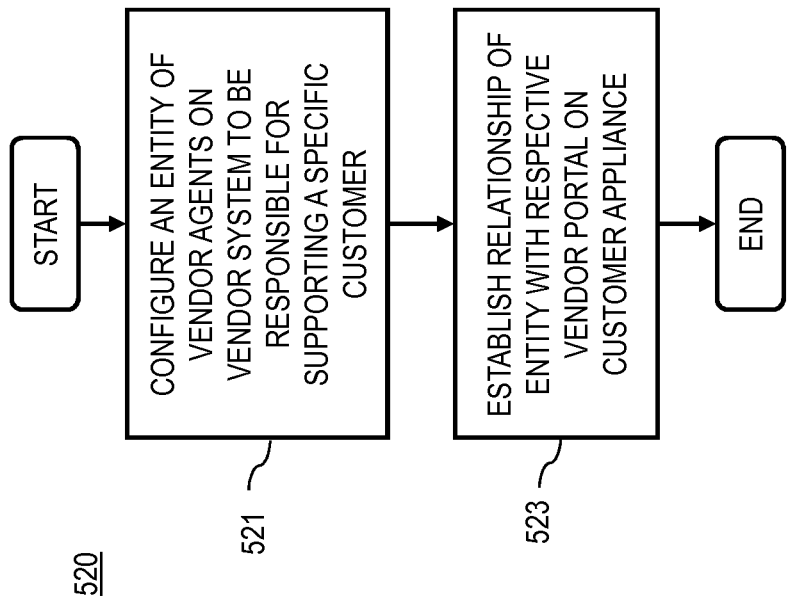
FIGS. 5A and 5B are flowcharts of processes for establishing relationships between vendor and customer remote support systems, according to an exemplary embodiment.
Figure 5B:
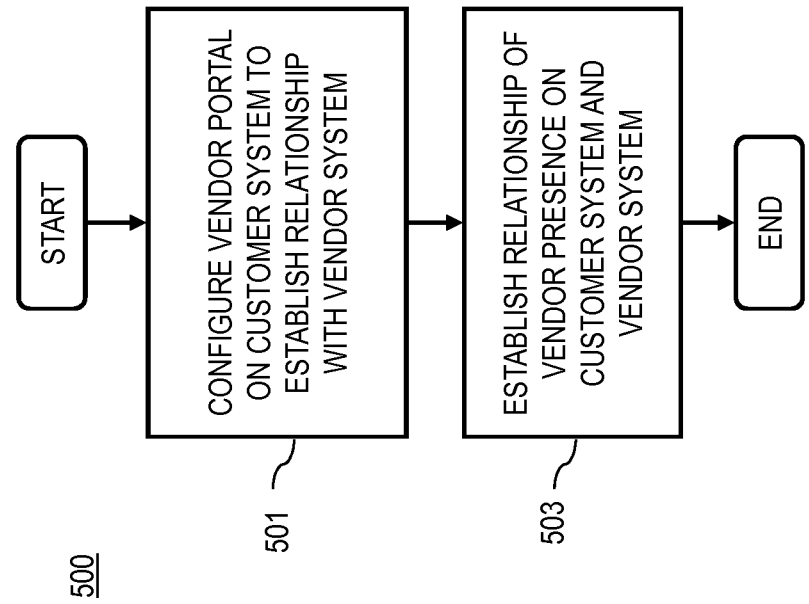

FIGS. 5A-5B show the configuration methods of establishing a relationship between a Vendor's remote support appliance and the organization receiving the vendor's support portal on the organization's remote support appliance, according to various embodiments. As seen in the process 500 of FIG. 5A, the vendor portal 111 on the customer's support appliance 101*a* is configured as to establish a relationship with the vendor's support appliance 101*b* (step 501) Subsequently, vendor presence is provided on the customer system (step 503). In another embodiment (shown in the process 520 of FIG. 5B), an entity of the vendor agents on the vendor system or appliance 101*b* is configured to be responsible for supporting a specific customer (step 521). Thus, a relationship is established with the corresponding vendor portal 111 on the customer appliance 101*a* (step 523).

Figure 6A:
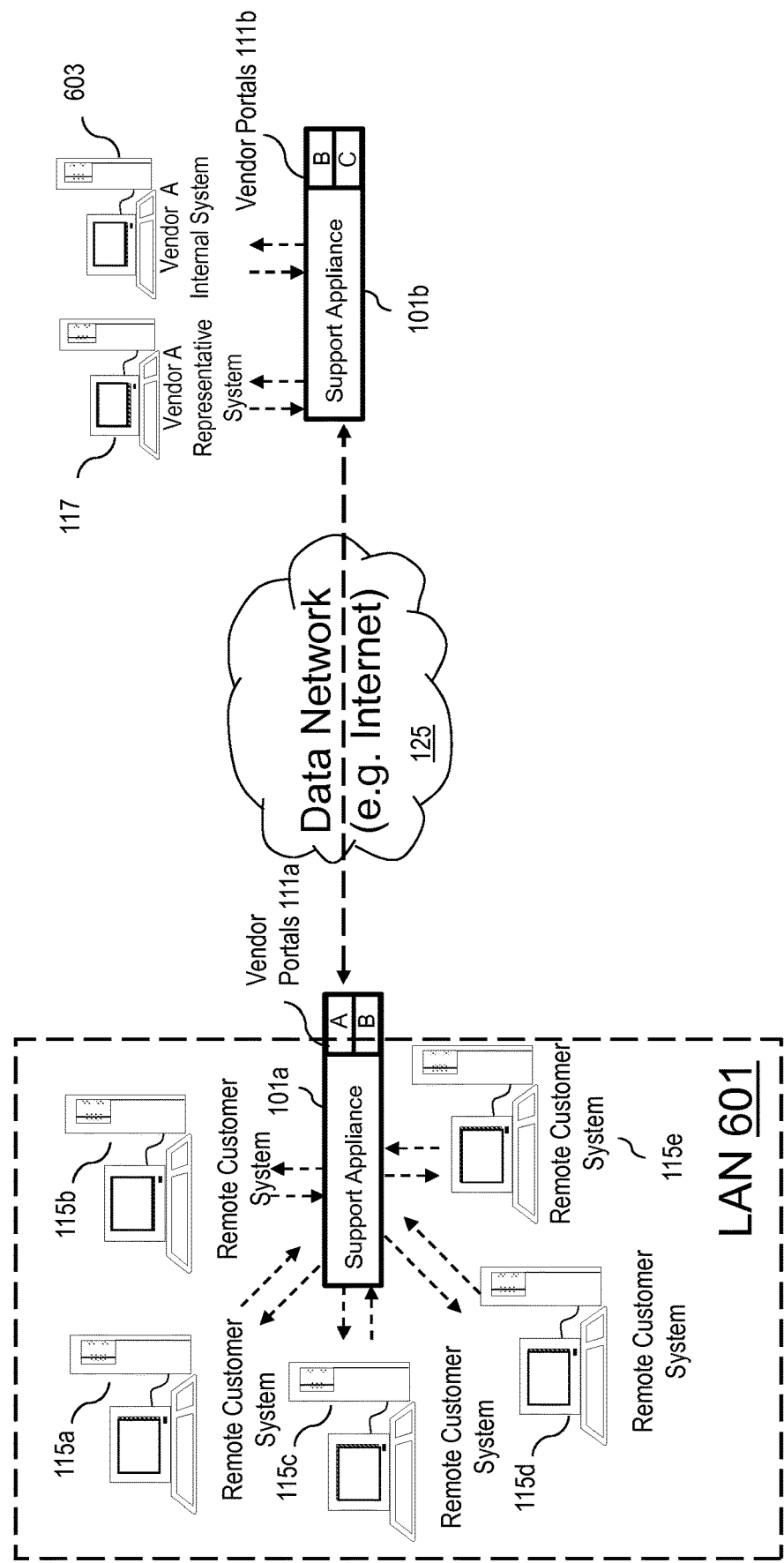
FIGS. 6A-6C are diagrams of a system and associated processes for providing a vendor portal as an agent or a proxy, according to certain embodiments.
Figure 6C:
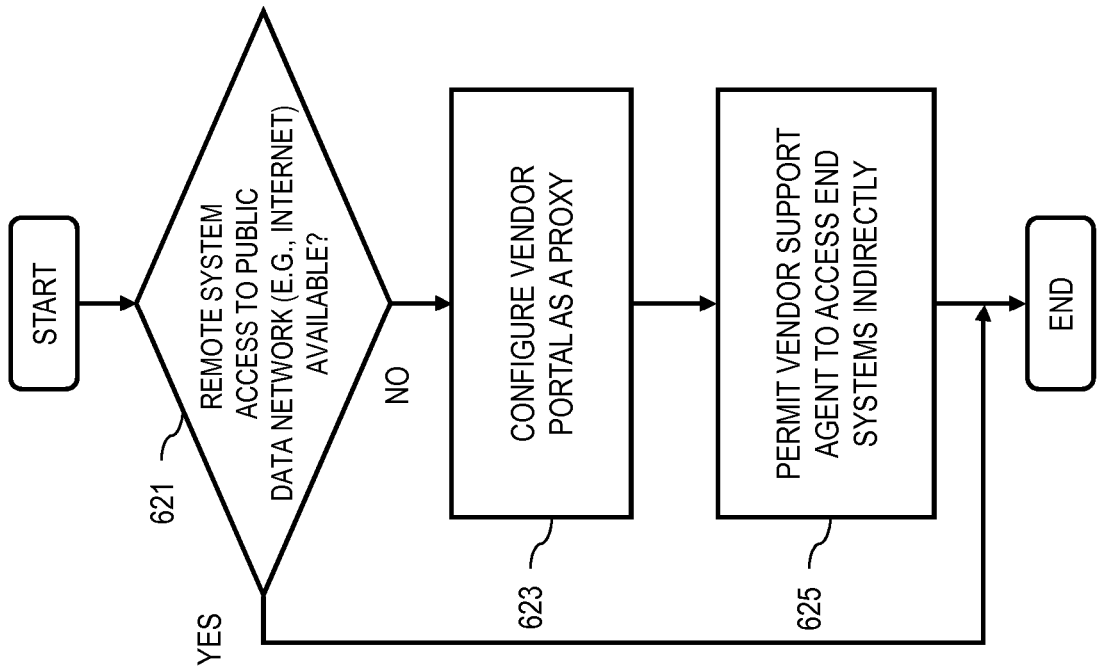
Figure 6B:
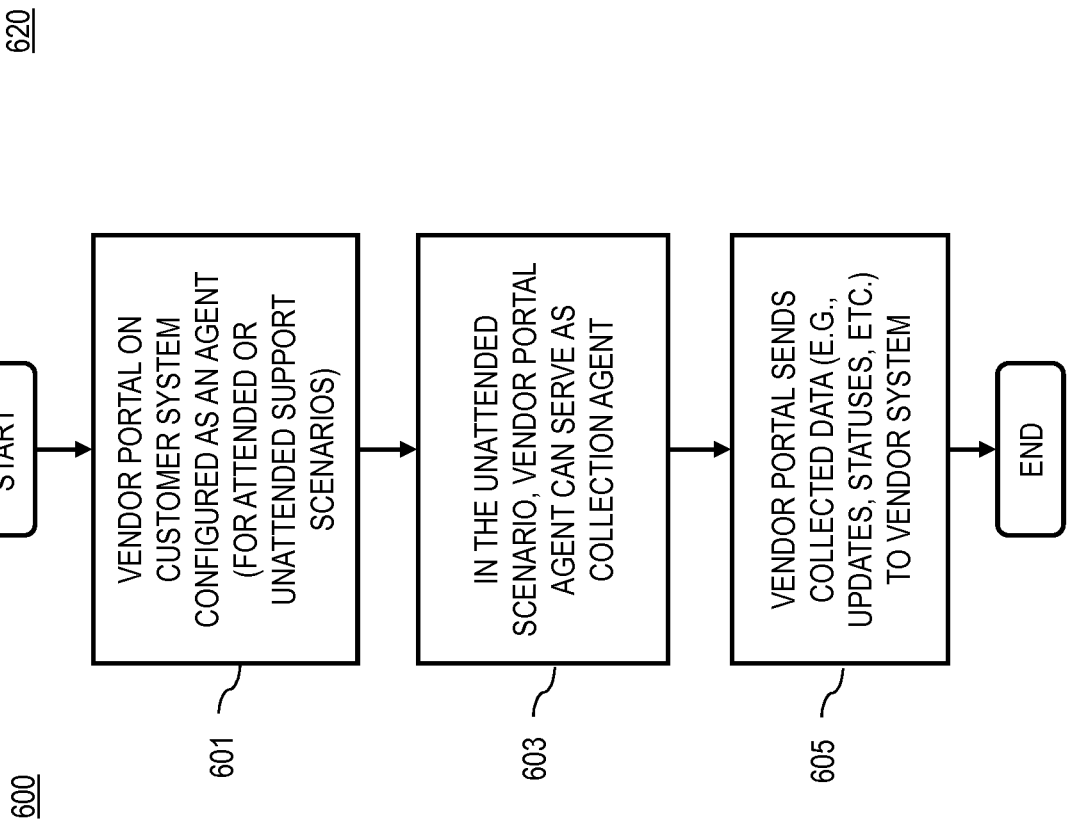

FIGS. 6A-6C are diagrams of a system and associated processes for providing a vendor portal as an agent or a proxy, according to certain embodiments. The process 600 of FIG. 6B and the process 620 of FIG. 6C are described with respect to the diagram of FIG. 6A. As shown in FIG. 6A, remote customer systems 115*a*-115*e* are connected over a local area network (LAN) 601 at a customer site. Each of the remote customer systems 115*a*-115*e* may have no direct connectivity, limited direct connectivity, or full connectivity to the data network 125. In other words, all or a portion of the systems 115*a*-115*e* may have varying levels of connectivity to the Internet and, therefore, varying levels of connectivity to Vendor A representative system 117 for remote support. In this example, the LAN 601 includes a support appliance 101*a* with connectivity via vendor portals 111*a* over the data network 125 to another support appliance 101*b* operated by Vendor A. Further, each of the remote customer systems 115*a*-115*e* has connectivity to the support appliance 101*a*. By way of example, the support appliance 101*b* has connectivity to the Vendor A representative system 117 and a Vendor A internal system 603.

Given the connectivity and configuration of the components described in FIG. 6A, the vendor portal on the customer appliance can serve as an agent for both attended and unattended support scenarios as described in the processes of FIGS. 6B and 6C. As shown in the process 600 of FIG. 6B, one such support scenario is through enabling a remote support application to be pushed to a remote system, executed, and connected back to the vendor support agent via the vendor appliance (step 601). For unattended systems that have been configured with a preinstalled remote support client, the vendor portal agent can serve as the collection agent for updates and statuses from the remote support client (step 603). The vendor portal agent can send these collective updates and statuses to the vendor appliance in a batched manner periodically (step 605).

As shown in the process 620 of FIG. 6C, for attended and unattended support scenarios in which the end systems do not have access to a public data network (e.g., Internet) (step 621), the vendor portal can serve as a proxy (step 623), enabling the vendor support agent to access end systems through the internet indirectly through the vendor portal even though the end systems do not have direct internet access (step 625).

Figure 7:
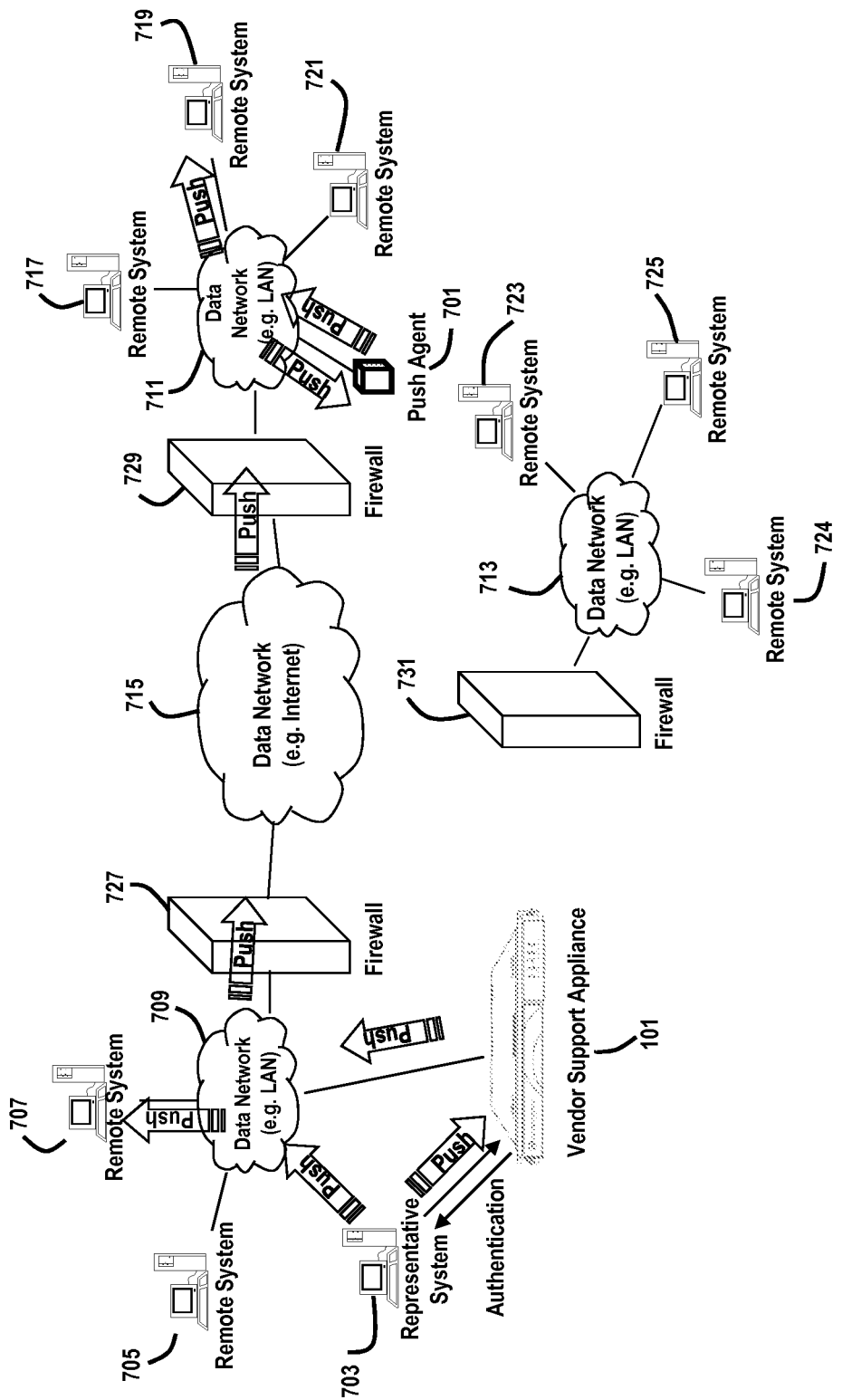
FIG. 7 is a diagram of a system capable of providing Push and Start technology within local area network (LAN) as well as remote networks, according to an exemplary embodiment.

FIG. 7 is an illustration of a system capable of providing Push technology within a local area network (LAN) as well as within a remote network, according to an exemplary embodiment. Traditional remote support approaches using remote control and visualization application tool is one of the means to efficiently provide assistance to remote users. In addition to attended remote support, a means to remotely access or control unattended systems further improves the efficiency of support organizations. Without the need for pre-installed clients on a system, a Push and Start System can be used by the representatives of a support organization to transfer an application to an attended or unattended remote system and execute the application to establish a session connection back to the representative. The Push functionality provides reach to systems which are visible from within the network that the support representative's computer is connected to via a Local Push method and reach to systems within remote networks through a Push via a Push Agent mechanism.

Within an exemplary context of remote support by remote controlling or accessing another computer, "Push" is a feature that allows a support representative to transfer an application to a remote computer in need of support and have the application executed whereby enabling the support representative to then remotely control or access the remote computer. No interaction is required at the remote computer for the process to complete, but interaction may optionally be enabled that allows any user present at the remote computer to refuse access for whatever reason. The support representative may or may not be required to have or to enter authentication/authorization credentials to gain access to the computer in need of support. The requirement of credentials would depend on the transfer and/or execution method used in the Push process. Furthermore, this process, unlike conventional approaches, requires no existing piece of the support product to have been previously installed on the remote computer.

In one embodiment, the actual Push of software to the remote computer and its execution can be accomplished via SMB (System Management Bus), Windows RPC (Remote Procedure Calls)/IPC (Inter Process Communication), Unix/Posix RPC, FTP (File Transfer Protocol), SSH (Secure Shell), HTTP (Hypertext Transfer Protocol) or other means.

The system, according to various embodiments, utilizes the following components (not shown): (1) a representative client application; (2) a Push Server—which is what handles the operations in within the appliance; (3) an optional Push Agent; and (4) a customer client application. It is contemplated that the Push Agent (e.g., Push Agent 701) can be an application that is installed on a system or alternatively can be a stand alone piece of hardware. The Push Server can be an application installed on an appliance 101 or a system (e.g., representative system 703, remote system 705, or remote system 707 of the data network 709) or alternatively can also be a stand alone piece of hardware. The Push Server can also be a piece of software integrated into the representative client application (e.g., executing on the representative system 703) where it serves its purpose within the application in the background.

Furthermore, this Push Agent 701 can be used as an agent for other purposes, such as a connection agent to another server (not shown) in its network (e.g., the network 711) or a second network (e.g., networks 709 or 713); that is, providing a connection to and forwarding of operations via a Push Agent 701, from the first network 709 to a device of a second network (e.g., devices 717-721 of the network 711 or devices 723-727 of the network 713) via, for instance, a third network 715.

In this example, a customer client application resident within a remote access and control appliance 101 or a Push server (not shown) can be accessed by a service representative system 703 which is running a representative client application. The customer client application can be transferred to a remote system in this network (Local Push) (e.g., remote systems 705 and 707 of the network 709) by utilizing a 'Push Agent' system or the service representative system 703's representative client application. In this manner, an IT service representative, for instance, can perform problem resolution, maintenance, and infrastructure development tasks quickly and easily from a single point.

The network visibility of the support representative's computer 703 is limited to the networks to which it is connected. Therefore, with no extra means provided, the reach of the Push feature from the support representative's computer is limited to only those computers to which network traffic is routable. To extend this range, a Push Agent 701 is introduced; for example, one such an agent is known as Jumpoint™ by Bomgar™. The Push Agent 701, in an exemplary embodiment, is an application installed on a computer that can perform the push-and-execute operation on behalf of authorized support representatives. Alternatively, the Push Agent 701 can be a standalone piece of hardware. The support representatives may be in contact with the Push Agent 701 by their mutual participation on an overlay network 715, by HTTP (Hypertext Transfer Protocol), VPN (Virtual Private Network), by programmatic email, or by any other means devised for the support representative's computer to communicate with the Push Agent 701. The 'Push Agent' supports a fully integrated software distribution mechanism for ease of installation of the remote access and control Push Agent on a managed system (e.g., remote access and control appliance 101 or computer) over the network 715.

It is contemplated that the Push Agent 701 can be an application that is installed on a system or alternatively can be a stand alone piece of hardware. The Push Server can be an application installed on an appliance or a system or alternatively can also be a stand alone piece of hardware. The Push Server can also be a piece of software integrated into the representative client application where it serves its purpose in within the application in the background.

Furthermore, this Push Agent 701 can be used as an agent for other purposes, such as a connection agent to another server (not shown) in the second network; that is, providing a connection to and forwarding of operations via a Push Agent 701, from a first network to a device of a second network.

After the support representative system is connected to the remote Push Agent 701 (which resides within an appliance 101 or a computer) via the Push Server, the service representative system 703 prompts the remote Push Agent 701 to transfer an application to a remote computer (e.g., remote systems 723-725), which resides outside of the network. In an exemplary embodiment, a Web browser based remote control is available and can perform a push instruction from a remote site to a targeted Push Agent 701. Upon receiving a request, the remote Push Agent 701 transfers the application to a client remote system. In this manner, integrated remote access and control tools enable both efficient remote problem resolution and critical visibility limitation when deploying application to a targeted client remote system. This also enables a service representative to efficiently implement application tools and maintain security throughout the enterprise right from the representative's desk.

In an exemplary embodiment, the appliance 101 uses certificate-based authentication to establish a persistent connection to the Push Agent 701. When requesting a remote control session on a remote system via the Push functionality, the appliance 101 ensures that the representative 703 has the right to push the customer client application to a targeted remote client system (e.g., remote systems 717-721). The customer client application then can be transferred from the Push Agent 701 to the remote client system. The remote client system can then establish a session connection to the service representative's system. In some cases, the session connection traverses one or more firewalls 727-731 as previously described.

Figure 8:
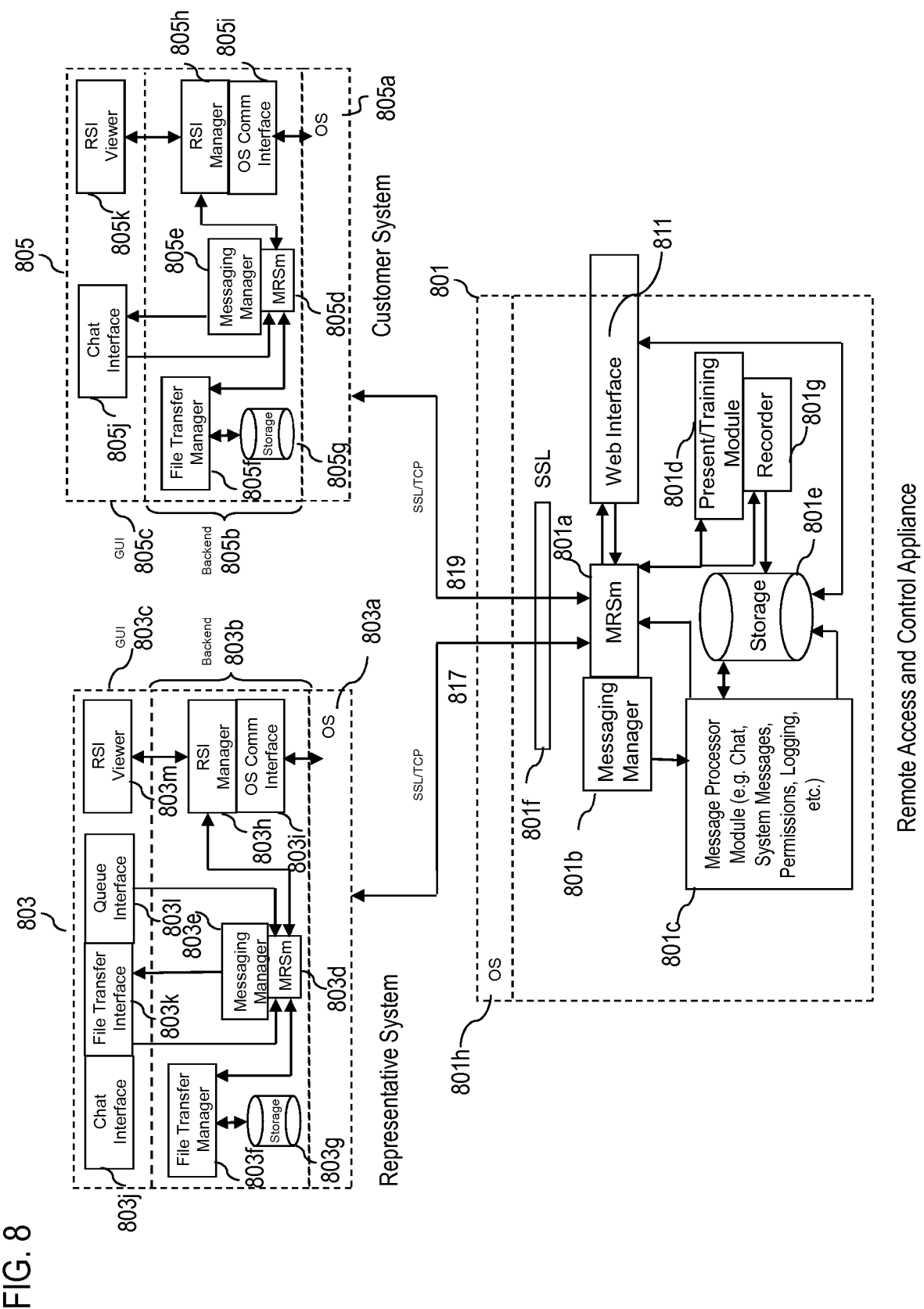
FIG. 8 is a diagram of the software architecture of the communication system of FIG. 1, according to an exemplary embodiment.

FIG. 8 is a diagram of the software architecture of the communication system of FIG. 1, according to an exemplary embodiment. The product data transfer architecture, in one embodiment, is formed based on a message handling and routing system—denoted as a Message Router System (MRS) which includes a collection of MRS modules (i.e., MRSm 801*a*). The MRSm's 801*a*, 803*d*, and 805*d* provide a message routing system that enables the routing of data within envelopes among the appliance 801, representative system 803 and remote customer system 805 with, for example, mailboxes as data endpoints. The mailboxes, which can be used for sending and receiving data, are also responsible for all handling of encoding (creation) and decoding of message envelopes with appropriately designed read and write methods. By way of example, the message envelope can include the following fields: a fromRouterID field specifying an identifier associated with the MRS 801*a*, a toRouterAddress field specifying addressing information of the destination routing module.

In addition, the MRS 801*a* can communicate with other modules in a manner similar to that described above. By way of example, the MRSm 801*a* can communicate with the web interface 811, a message manager 801*b*, a message processor module 801*c* (includes chat, permission, logging, etc.), a present/training 801*d*, a secure layer module 801*f* (e.g., SSL wrapper module), and a recorder module 801*g*. The web interface 811 can communicate with other application modules via the MRS 801*a*.

In an exemplary embodiment, the web interface 811 includes the following: (1) a network configuration web interface; (2) a User/Admin web interface which includes but not limited to user profile configuration, log reporting interface, and administrative user interface; (3) a support portal that provides, in an exemplary embodiment, front end survey and session key submission components; and (4) a customer satisfaction (exit) survey. According to one embodiment, the web interface provides functions for configuring the appliance 801 to be deployed and integrated into the network infrastructure of the installer. In one embodiment, all other interfaces can communicate through the MRSm 801*a* or to a storage module 801*e* directly.

For ensuring proper dispatching of system messages received at the MRSm 801*a*, a message manager 801*b* can be used in this exemplary embodiment. These messages can include such data as chat data, session system data logging, system message posting, and system message queries, etc.

The message processor module 801*c* receives system messages from MRSm 801*a* via the message manager module 801*b*. These messages can include such date as chat, session system data logging, system message posting, system message queries, permissions queries, and storage data retrievals.

The present-training module 801*d* is configured to reduce the amount of screen update data transmitted from the client-side. In an exemplary embodiment, the present-training module 801*d* includes the following components (not shown): a viewer component, and one or more remote screen image servers. These servers collect RSI change updates and send them on to the RSI viewer via the MRSm 801*a*. The viewer component receives RSI update data from a client-side (remote-side in this case) server via the MRSm 801*a* and then sends the data off to the active servers to be transmitted to the appropriate destination. The main stream of RSI update data can be transmitted to the appropriate client via the MRSm 801*a*. Another stream of screen update data is transmitted to the recorder module 801*g* to be written into the storage module 801*e*.

The SSL module 801*f* ensures that the data transfer between the appliance 801 and the representative and customer system (803 and 805) is encrypted, e.g., 256-bit AES SSL encryption over links 817 and 819.

In one embodiment, the remote access and control appliance 801 utilizes an operating system (OS) 801*h* that supports a variety of applications. For example, a web server application can run on top of the OS 801*h* to provide web hosting capabilities. The OS 801*h* can also support SSL. The SSL wrapper module 801*f* provides SSL over Transmission Control Protocol (TCP) or other network protocols.

As described, in one embodiment, the network appliance utilizes an OS 801*h* with a web server for providing web hosting capabilities. The routing and handling module (e.g., MRSm) 801*a*, which is a transport layer atop the OS 801*h*, provides various network facilities. Accordingly, MRSm 801*a* provides the generic means of transporting data from one system to another.

The MRSm 801*a* of the network appliance 801 can communicate with the customer application of customer system 805, and the representative application of the representative system 803 or another appliance.

Under this example, the representative system 803 and customer system 805 include operating systems 803*a*, 805*a*; backend components 803*b*, 805*b*; and GUIs 803*c*, 805*c*. The backend components 803*b* of the representative system 803 can include a MRSm 803*d*, a message manager module 803*e*, and a file transfer manager module 803*f* The module 803*f* interfaces with a storage module 803*g*, which is configured to store retrieved content stemming from the operation of the file transfer manager module 803*f*. The backend components 803*b* also include a RSI manager module 803*h*. Yet another module 803*i* (i.e., OS interface module), which is integral to the backend components 803*b*, provides communication interfaces to the OS 803*a*. As shown, the backend components 805*b* of the customer system 805 resemble that of the backend components 803*b* of the representative system 803: a MRSm 805*d*, a message manager module 805*e*, and a file transfer manager module 805*f*, a storage module 805*g*, a RSI manager module 805*h*, an OS interface module 805*i*.

As for the GUI 803*c*, the representative system 803 can provide a number of interfaces depending on the applications. For instance, the GUI 803*c* can include a chat interface 803*j*, a file transfer interface 803*k*, a queue interface 803*l*, and a viewer 803*m*. In this example, the customer system 805 utilizes a chat interface 805*j* and a viewer 805*k*. The GUI 803*c* can include other interfaces such as remote command shell, system diagnostics, and system information to name a few. The GUI 805*c* can include application specific chooser interface to only allow specific application viewing.

As explained with respect to the operation of the network appliance 801, the MRSm 803*d* is the medium for handling all messages coming to the representative application 821 and all messages sent from the representative application 821. The MRSm 803*d* communicates with the message manager 803*e*, a RSI manager 803*h*, and the file-transfer manager modules 803*f*. The system messages, session data, and chat data are delivered to the message manager module 803*e*. The MRSm 803*d* sends, as well as receives, system/control messages and RSI update data to and from the RSI manager module 803*h*. The MRSm 803*d* interacts with the file-transfer manager 803*f* in sending and receiving system messages and file-transfer data.

The file-transfer manager 803*f* handles all remote-to-local and local-to-remote (i.e. between the representative system and the customer system) reading and writing of files. The system messages and file-transfer data are received and sent through the MRSm 803*d*. Notably, the file-transfer interface module 803*k* on the GUI component 803*c* receives data from the MRSm 803*d* and sends all data directly to the MRSm 803*d*. Assuming the permissions to the customer file system access have been granted, the processes and steps involved in transferring a file from representative storage 803*g* to the customer storage 805*g* include an initiation of a file transfer from the file-transfer GUI, a system command message sent to the MRSm 803*d*. MRSm 803*d* delivers the command to the file-transfer manager module 803*f* to execute on constructing the data to be sent to MRSm 805*d* of the customer system 805 via the MRSm 803*d*. A system notification message is delivered to the message manager 803*e* via MRSm 803*d* to be displayed in the chat GUI 803*j* after being delivered there by the message manager 803*e*. The processes and steps involved in transferring a file from the customer to the representative include an initiation from the file-transfer GUI 805*k*, a system command message sent to the file-transfer manager 805*f* via the customer MRSm 805*d*. The file-transfer manager 805*f* constructs a proper remote file transfer request, which is then sent through the customer MRSm 805*d* to the representative MRSm 803*d* through the MRSm 801*a* on the appliance. The representative MRSm 803*d* receives the request command, delivering it to the remote file-transfer manager 803*f*, which in turn, receives the file system data requested to be transmitted back to the customer MRSm 805*d* by the representative MRSm 803*d* through the MRSm 801*a* on the appliance. The representative MRS 803*d* delivers the file system data received from the customer MRS 805*d* to the file-transfer manager 803*f* for processing and storing in the local file system storage 803*g*. Also, a system notification message as well as a file-transfer GUI refresh command is delivered to the file-transfer GUI 803*k* via the dispatcher 803*e* from the MRS 803*d*.

The RSI manager modules 803*h* and 805*h*, in one embodiment, includes the following components: a RSI updater, which "paints" the RSI viewer GUIs 803*m* and 805*k* with RSI screen update data; RSI server, which utilizes the OS Communication Interface modules 803*i* and 805*i*. The OS communication interface modules 803*i* and 805*i* interfaces with the OS system 803*a* and 805*a* for detecting and listening for screen and system updates, collecting these updates, and packaging and encoding these updates into data to be then sent to the viewing system via the respective MRSm's.

The RSI manager modules 803*h* and 805*h* can also provide the capability of reverse viewing. In this mode, the viewing of the remote system is reversed to being viewed by the remote system.

The network appliance 801 also permit support representatives to predict and lower the total cost of ownership (TCO) vis-à-vis the ASP model, in which the support representatives are typically charged a monthly fee. With the network appliance 801, representatives can predict their budget without monthly fees, surcharges or overages.

Figure 9:
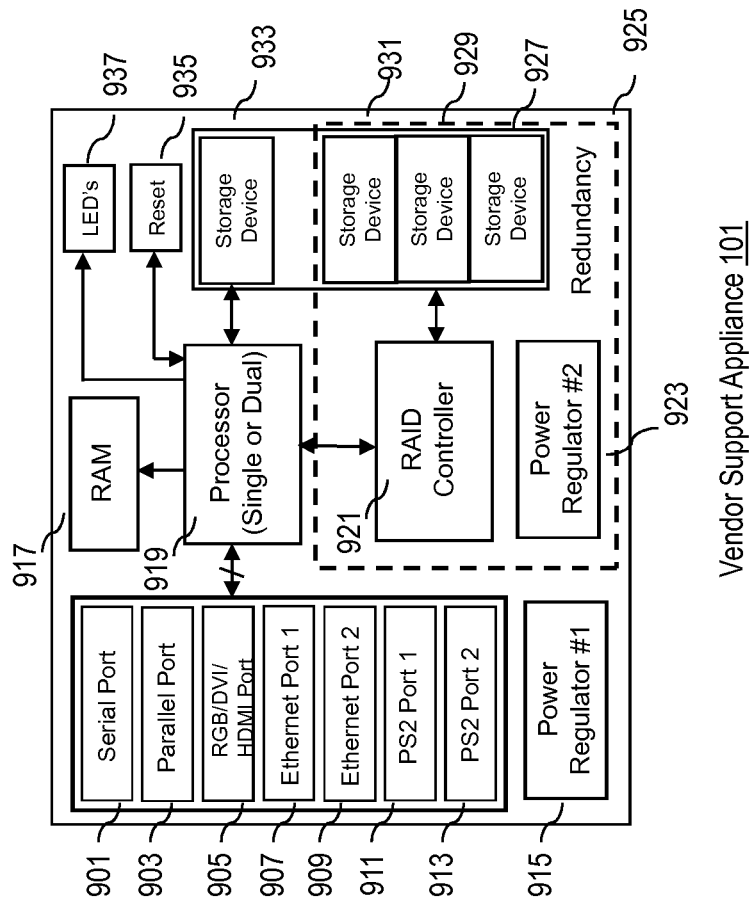
FIG. 9 is an exemplary hardware architecture of a remote access and control appliance, according to an exemplary embodiment.

FIG. 9 is an exemplary hardware architecture of a remote access and control appliance, according to an exemplary embodiment. The network appliance 101, in one embodiment, comprises various component interfaces, including serial and parallel ports 901 and 903, a display interface (e.g., an RGB (Red, Green and Blue) port 905), local area network (LAN) ports (e.g., Ethernet ports) 907 and 909, and input device ports (e.g., PS2) 911 and 913. The network appliance 101 also contains a power regulator 915, internal memory in the form of RAM (Random Access Memory) 917, one or more processors 919, each which may be a multi-core processor, LEDs (Light Emitting Diodes) 937, reset control 935 and a SATA (Serial Advanced Technology Attachment) storage drive 933.

As mentioned, the network appliance 101, in an exemplary embodiment, can be a 1U rack-mountable server hardware. However, it is contemplated that configurations other than those illustrated in FIG. 9 can be constructed, depending on the particular applications. For example, different types of appliances can be designed for different uptime requirements. With uptime-critical customers, the network appliance 101 provides for fail-over redundancies; e.g., use of multiple disk drives 927-931, for Fail-over and Hot-Swap capabilities via a RAID (Redundant Array of Independent Disks) controller 921. This configuration of the appliance 101 can also be equipped with a backup AC-DC (Alternating Current-Direct Current) regulator 923, which can be triggered when the main regulator 915 is detected as non-functional. Alternatively, for non-uptime-critical customers, the network appliance 101 can be configured without the additional hardware and/or software required for providing redundancies.

The network appliance 101 is configured to communicate with the representative system 113, the customer system 115, and the vendor representative system 117 and can be collocated within any of these systems 113-117. The network appliance 101, in various embodiments, execute software applications that can receive, handle, manage, and dispatch system or data messages to and from the representative, vendor, and customer applications 105-109 within the respective systems 113-117 via secure links 129-133. In one embodiment, the security on these links is achieved using the 256-bit Advance Encryption Standard (AES) Secure Sockets Layer (SSL).

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

On the customer side, the customer application 109 is installed temporarily (in one embodiment). The customer application 109, in an exemplary embodiment, can be a native application, as to achieve a reduced executable size for quick download by the remote customer from the network appliance 101. Architecturally, this application 109 can be identical to the representative application 105 and or the vendor application 107. One difference with this application 107 is the use of an uninstaller component, in which the application 107 is capable of uninstalling itself when, for example, a session is completed with proper termination, a session is ended by the user of this customer application 109, or a session connection timed out. In the alternative, the customer application 109 can be permanently installed.

With the above arrangement, the representative application 105 and/or the vendor application 107 via the network appliance 101 can securely communicate with the customer application 109 to access and control the customer system 115.

The processes described herein for providing vendor remote support and management via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
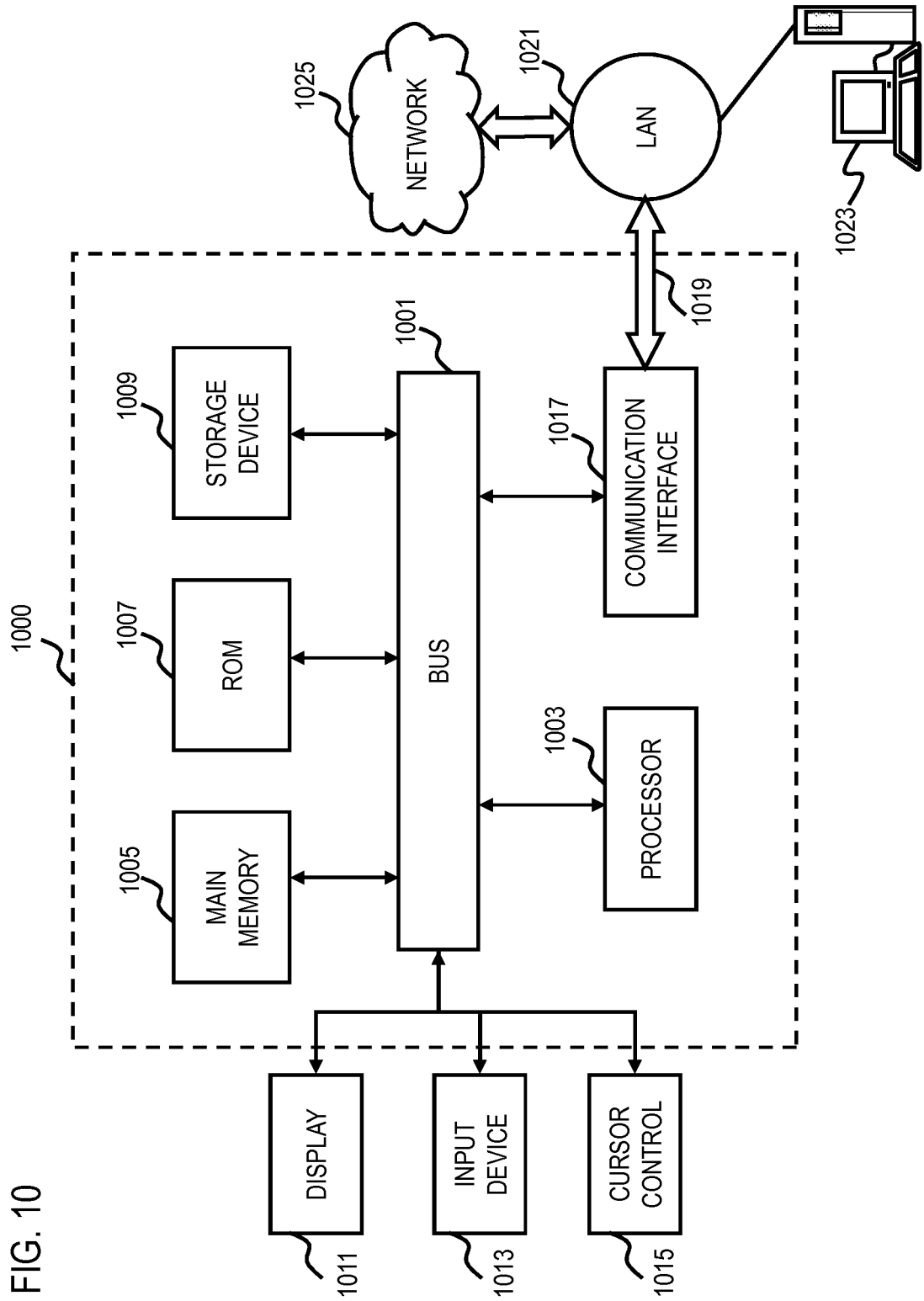
FIG. 10 is a diagram of a computer system that can be used to implement various embodiments of the invention.

FIG. 10 illustrates computing hardware (e.g., computer system) upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as random access memory (RAM) or other dynamic storage device, coupled to the bus 1001 for storing information and instructions to be executed by the processor 1003. Main memory 1005 also can be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 11:
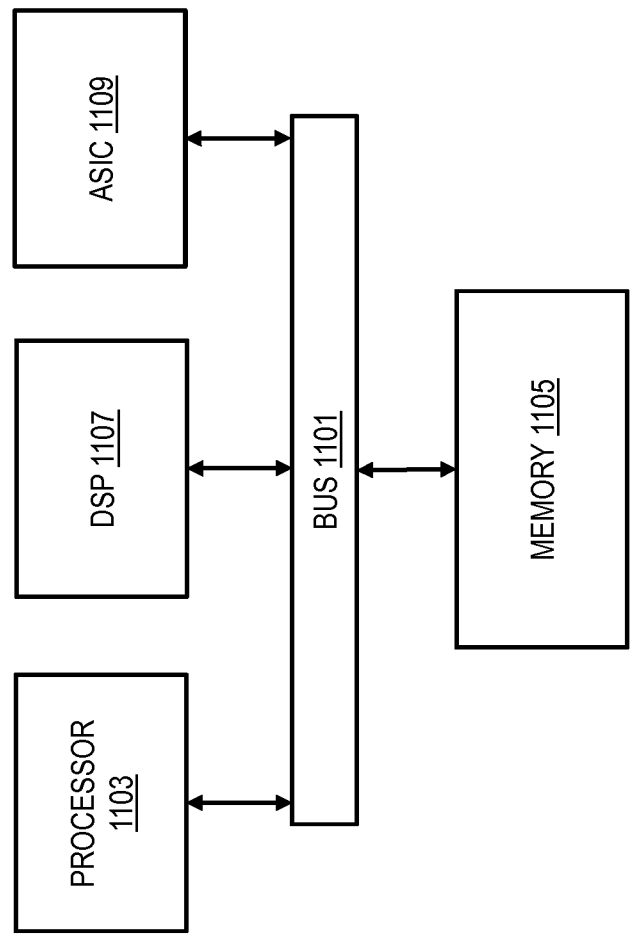
FIG. 11 is a diagram of a chip set that can be used to implement various exemplary embodiments.

FIG. 11 illustrates a chip set 1100 upon which an embodiment of the invention may be implemented. Chip set 1100 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of FIGS. 2B, 3B, 5A, 5B, 6B, and 6C.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 1105 also stores the data associated with or generated by the execution of the inventive steps.

While the invention has been described in connection with a number of embodiments and implementations, the invention is not so limited but covers various obvious modifications and equivalent arrangements, which fall within the purview of the appended claims.

What is claimed is:

1. A method comprising:
   configuring, by a representative system, a remote support and management appliance to host a plurality of vendor portals including a first vendor portal and a second vendor portal, wherein the representative system and the remote support and management appliance operate according to a software-as-a-service model, wherein the plurality of vendor portals correspond to a plurality of different vendors;
   transmitting, by the remote support and management appliance and via a push agent, a first push request to a first customer device comprising first application software configured to establish a first remote control session, wherein the first customer device does not otherwise comprise the first application software, a firewall is positioned between the remote support and management appliance and the first customer device, and the push agent is located on a same side of the firewall as the first customer device;
   establishing, by the remote support and management appliance, the first remote control session comprising a network connection between a first vendor representative system of a first vendor and the first customer device via the first vendor portal based on the first appliance software being executed by the first customer device, wherein the first customer device is associated with a customer of the first vendor;
   transmitting, by the remote support and management appliance, a second push request to a second customer device comprising second application software configured to establish a second remote control session, wherein the second customer device does not otherwise comprise the second application software;
   establishing, by the remote support and management appliance, the second remote control session comprising a network connection between a second vendor representative system of a second vendor and the second customer device via the second vendor portal based on the second appliance software being executed by the second customer device, wherein the second customer device is associated with a customer of the second vendor;
   providing, via the first vendor portal and the first remote control session, remote control of the first customer device directly by the first vendor representative system; and
   providing, via the second vendor portal and the second remote control session, remote control of the second customer device directly by the second vendor representative system, wherein the first vendor representative system and the second vendor representative system are subscribers to the software-as-a-service model.

2. A method of claim 1, further comprising:
   receiving a first security policy specified by the customer of the first vendor, wherein the direct control of the first customer device is according to the first security policy; and
   receiving a second security policy specified by the customer of the second vendor, wherein the direct control of the second customer device is according to the second security policy, and wherein the security policies include, at least in part, access rights, remote control permissions, access guidelines, or a combination thereof.

3. A method of claim 1, wherein the representative system is further configured to provide the remote control of the first customer device and the second customer device through a plurality of firewalls, the plurality of firewalls comprising the firewall.

4. A method of claim 2, further comprising:
   recording activities associated with the remote control of the first customer device and the second customer device; and
   processing audit of the recorded activities for compliance with the corresponding security policies.

5. A method of claim 2, further comprising:
   assigning, by the representative system, the first security policy to the first vendor; and
   assigning, by the representative system, the second security policy to the second vendor.

6. A method claim 1, further comprising:
   configuring, by the representative system, the remote support and management appliance as a proxy for a plurality of other remote support and management appliances associated correspondingly with the first vendor or the second vendor.

7. An apparatus comprising:
   at least one processor; and
   at least one memory including computer program code for one or more programs, the at least one memory and the computer program code configured to, with the at least one processor, cause the apparatus to perform at least the following:
   configure, by a representative system, a remote support and management appliance to host a plurality of vendor portals including a first vendor portal and a second vendor portal, wherein the representative system and the remote support and management appliance operate according to a software-as-a-service model, wherein the plurality of vendor portals correspond to a plurality of different vendors;
   transmit, via a push agent, a first push request to a first customer device comprising application software configured to establish a first remote control session, wherein the first customer device does not otherwise comprise the application software, a firewall is positioned between the remote support and management appliance and the first customer device, and the push agent is located on a same side of the firewall as the first customer device;
   establish, by the remote support and management appliance, the first remote control session comprising a network connection between a first vendor representative system of a first vendor and the first customer device via the first vendor portal, wherein the first customer device is associated with a customer of the first vendor;
   transmit a second push request to a second customer device comprising application software configured to establish a second remote control session with the second customer device, wherein the second customer device does not otherwise comprise the application software;

establish, by the remote support and management appliance, the second remote control session comprising a network connection between a second vendor representative system of a second vendor and the second customer device via the second vendor portal, wherein the second customer device is associated with a customer of the second vendor;

provide, via the first vendor portal and the first remote control session, remote control of the first customer device directly by the first vendor representative system; and provide, via the second vendor portal and the second remote control session, remote control of the second customer device directly by the second vendor representative system, wherein the first vendor representative system and the second vendor representative system are subscribers to the software-as-a-service model.

8. An apparatus of claim 7, wherein the apparatus is further caused to:

receive a first security policy specified by the customer of the first vendor, wherein the direct control of the first customer device is according to the first security policy; and receive a second security policy specified by the customer of the second vendor, wherein the direct control of the second customer device is according to the second security policy, and wherein the security policies include, at least in part, access rights, remote control permissions, access guidelines, or a combination thereof.

9. An apparatus of claim 7, wherein the representative system is further configured to provide the remote control of the first customer device and the second customer device through a respective subset of a plurality of firewalls, the plurality of firewalls comprising the firewall and the respective subset of the plurality of firewalls corresponding to the second customer device excludes the firewall.

10. An apparatus of claim 8, wherein the apparatus is further caused to:

record activities associated with the remote control of the first customer device and the second customer device; and process audit of the recorded activities for compliance with the corresponding security policies.

11. An apparatus of claim 8, wherein the apparatus is further caused to:

assign, by the representative system, the first security policy to the first vendor; and assign, by the representative system, the second security policy to the second vendor.

12. An apparatus of claim 7, wherein the apparatus is further caused to:

configure, by the representative system, the remote support and management applicant as a proxy for a plurality of remote support and management appliances associated correspondingly with the first vendor or the second vendor.

13. A system comprising:

a first vendor representative system configured to communicate with a first customer device associated with a customer of a first vendor;

a second vendor representative system configured to communicate with a second customer device associated with a customer of a second vendor;

a remote support and management appliance configured to host a plurality of vendor portals including a first vendor portal and a second vendor portal for the first vendor representative system and the second vendor representative system, respectively, wherein the plurality of vendor portals correspond to a plurality of different vendors, and wherein the remote support and management appliance comprises a push server;

a representative system configured to establish the first vendor portal and the second vendor portal on the remote support and management appliance, wherein the representative system and the remote support and management appliance operate according to a software-as-a-service model, and wherein the first vendor representative system and the second vendor representative system are subscribers to the software-as-a-service model;

the remote support and management appliance configured to:

transmit, via a push agent, a first push request to the first customer device comprising application software configured to establish a first remote control session, wherein the first customer device does not otherwise comprise the application software, a firewall is positioned between the remote support and management appliance and the first customer device, and the push agent is located on a same side of the firewall as the first customer device;

establish the first remote control session comprising a network connection between the first vendor representative system and the first customer device via the first vendor portal;

transmit a second push request to the second customer device comprising application software configured to establish a second remote control session, wherein the second customer device does not otherwise comprise the application software;

establish the second remote control session comprising a network connection between the second vendor representative system and the second customer device via the second vendor portal;

provide, via the first vendor portal and the first remote control session, remote control of the first customer device directly by the first vendor representative system; and provide, via the second vendor portal and the second remote control session, remote control of the second customer device directly by the second vendor representative system.

14. A system of claim 13, wherein the remote support and management appliance is configured to receive a first security policy specified by the customer of the first vendor, wherein the direct control of the first customer device is according to the first security policy, the remote support and management appliance being further configured to receive a second security policy specified by the customer of the second vendor, wherein the direct control of the second customer device is according to the second security policy, wherein the security policies include, at least in part, access rights, remote control permissions, access guidelines, or a combination thereof.

15. A system of claim 13, wherein the representative system is further configured to provide the remote control of the first customer device and the second customer device through a respective subset of a plurality of firewalls, the plurality of firewalls comprising the firewall.

16. A system of claim 14, wherein the remote support and management appliance is configured to record activities associated with the remote control of the first customer device and the second customer device, wherein the recorded activities are processed for as an audit for compliance with the corresponding security policies.

17. A system of claim 14, wherein the representative system is configured to assign the first security policy to the first vendor, and the second security policy to the second vendor.

18. The apparatus of claim 7, wherein the at least one processor further causes the apparatus to execute a push server configured to transmit the first push request to the first customer device.

19. The system of claim 13, further comprising a push server executed by the remote support and management appliance and a plurality of push agents, wherein the plurality of push agents comprises the push agent, the first push request is transmitted by the push server to the first customer device via the push agent, and the second push request is transmitted by the push server to the second customer device via a second push agent of the plurality of push agents.

20. The method of claim 1, wherein a proxy server is positioned between the remote support and management appliance and the second customer device, and transmitting the second push request is transmitted via the proxy server.

* * * * *